(12) United States Patent
Hwang

(10) Patent No.: US 6,618,634 B1
(45) Date of Patent: Sep. 9, 2003

(54) MICROCOMPUTER SYSTEM USING REPEATED RESET TO ENTER DIFFERENT OPERATING MODES AND METHOD TO DO THE SAME

(75) Inventor: Bar-Chung Hwang, Taoyuan (TW)

(73) Assignee: Winbond Electronics Corp., Hsinchu (TW)

(*) Notice: Subject to any disclaimer, the term of this patent is extended or adjusted under 35 U.S.C. 154(b) by 0 days.

(21) Appl. No.: 09/538,058

(22) Filed: Mar. 29, 2000

(30) Foreign Application Priority Data

Mar. 29, 1999 (TW) .......................... 88104913 A (51) Int. Cl.7 .............................................. G05B 9/02
(52) U.S. Cl. ........................... 700/79; 700/81; 700/14; 713/1; 714/23; 712/43; 712/229; 369/30.24; 369/30.36
(58) Field of Search .................. 700/32, 40, 75, 700/12, 17, 14, 83, 84, 80, 79, 81; 710/14; 713/1; 714/23; 712/43, 229; 369/30.24, 30.36

(56) References Cited

U.S. PATENT DOCUMENTS

| | | | | |
|---|---|---|---|---|
| 4,064,692 A | * | 12/1977 | Johnson et al. ............... 60/762 |
| 4,432,049 A | * | 2/1984 | Shaw et al. .................... 710/14 |
| 4,947,478 A | * | 8/1990 | Maeno .......................... 713/1 |
| 5,182,755 A | * | 1/1993 | Sekiguchi et al. ............. 714/55 |
| 5,537,654 A | * | 7/1996 | Bedingfield et al. .......... 710/14 |
| 5,566,117 A | * | 10/1996 | Okamura et al. ............. 365/222 |
| 5,940,583 A | * | 8/1999 | Taira et al. .................. 358/1.15 |
| 6,138,181 A | * | 10/2000 | Aida et al. ..................... 710/11 |
| 6,148,409 A | * | 11/2000 | Mores ......................... 713/330 |
| 6,198,381 B1 | * | 3/2001 | Turner et al. ............... 340/10.1 |

FOREIGN PATENT DOCUMENTS

| | | | | |
|---|---|---|---|---|
| JP | 01183701 A | * | 7/1989 | ............ G05B/9/02 |
| JP | 02091705 A | * | 3/1990 | ......... G05B/19/405 |

* cited by examiner

Primary Examiner—Emanuel Todd Voeltz
Assistant Examiner—Crystal J. Barnes
(74) Attorney, Agent, or Firm—Ladas & Parry (57) ABSTRACT

A microcomputer system and method of utilizing a repeated reset operation to enter the microcomputer system into different operating modes, particularly a microcomputer system without a keyboard, in which only a reset key is needed to set the required operating mode. The microcomputer system of the present invention comprises: a microcomputer; a memory connected to the microcomputer; a reset key to reset the microcomputer system; and a reset circuit to provide a power on reset pulse required in the microcomputer system or to receive the reset pulse produced by reset key. The microcomputer system checks both a specific memory area content for only a first specific value and a dedicated address content in the memory for a second specific value. If both only the first specific value in specific memory area and the second specific value in dedicated address are present, the microcomputer system is set to an abnormal operating mode. Otherwise, the specific value is written into the dedicated address in the memory. If the system is not reset within a predetermined waiting time, the microcomputer is entered into a normal operating mode.

11 Claims, 7 Drawing Sheets

MICROCOMPUTER SYSTEM USING REPEATED RESET TO ENTER DIFFERENT OPERATING MODES AND METHOD TO DO THE SAME

BACKGROUND OF THE INVENTION

1. Field of the Invention

The present invention relates to a microcomputer system utilizing a repeated reset operation to enter different operating modes, and the method to do the same.

2. Description of Related Art

Recently, various automation systems have been applied to everything from home utilities to factory equipment. These automation systems usually adopt either microcomputers or computer-controlled systems as the control center. In general, microcomputers or computer-controlled systems offer displays and keyboards to a user for monitoring and operating systems. In a microcomputer, self-detection or self-diagnosis programs are added in BIOS or in the form of packaged software applications, such as Scandisk and Norton. A computer technician can solve problems by pushing down a specific function key in a microcomputer to run these self-detection or self-diagnosis programs if the microcomputer is out of order.

However, for the purpose of simple structure and low cost, the system design for a microcomputer may omit the specific function key as mentioned above. Therefor, when the microcomputer is out of order, a computer technician has to solve the problem by using a dedicated self-diagnosis IC instead of the original one in the microcomputer. However, for a complicated mechanism such as a notebook computer, mounting and demounting an IC wastes time and manpower, and might damage the microcomputer.

SUMMARY OF THE INVENTION

Accordingly, to solve the problems of the prior art, it is an object of the present invention to provide a microcomputer system that utilizes a repeated reset operation to enter into different operating modes, and the method for doing the same. For a microcomputer system without a keyboard, the reset key on the microcomputer can be used to enter the microcomputer into the required operating mode; for example, to enter a self-diagnosis mode. By this way, it is not necessary to mount and demount an IC in the microcomputer when the microcomputer is out of order.

The microcomputer system according to the invention can be entered into different operating modes even if the microcomputer is not provided with a specific function key for doing so. Therefore, even microcomputers with keyboards can be simplified in terms of system configuration, thereby lowering the cost.

In the microcomputer system of the present invention, a general register or a memory will not clear its content during reset. Therefore, a specific value is written into an assigned register or memory a predetermined time after reset of the microcomputer system. If the microcomputer system is reset again during the predetermined time, the microcomputer will enter an operating mode according to the specific value. All the operating modes are stored in a predetermined program in the microcomputer. If the technician pushes the reset key again within the predetermined time after first reset operation, the microcomputer performs the corresponding self-diagnosis program and the results will be displayed on a display, thereby allowing the technician to repair or replace the elements of the microcomputer as necessary.

The present invention also provides a method utilizing repeated reset operations to enter different operating modes comprising the steps as follows:

First, when a microcomputer is started or manually reset, the program pre-programmed in the microcomputer will check the content of a specific address in the memory. The microcomputer will be set into an abnormal operating mode if a specific value indicating that a repeated reset has occurred is present in the specific address. The specific value indicating that a repeated reset has occurred will be written into the specific address if it is not already present. Then an echo message is outputted on the display. The microcomputer will repeat the first step if a reset occurs within a predetermined time. Alternately, the specific value will be cleared if the microcomputer system is not reset within the predetermined time, and echo message is cleared.

Next, check to see if an abnormal operating mode is set. If yes, the microcomputer enters the abnormal operating mode, otherwise the microcomputer enters the normal operating mode.

Therefore, the microcomputer will check to see whether or not a repeated reset has occurred before entering the normal mode, thereby determining whether or not to enter the abnormal mode. Accordingly, the repeated reset can be used to achieve the object of entering different operating modes.

The present invention can be applied to various microcomputer applications. For example, the microcomputer of a module testing board will display on the display whether an IC being tested is good or bad when a testing operator turns on the power and starts a particular testing signal source. If the technician wants to know which part of the IC is damaged or other characteristics of the ICs, the technician can simply push down the reset key twice within a predetermined delay time and enter the testing signal.

BRIEF DESCRIPTION OF THE DRAWINGS

Other objects, features, and advantages of the present invention will become apparent from the following detailed description of the preferred but non-limiting embodiment. The description is made with reference to the accompanying drawings in which.

DETAILED DESCRIPTION OF THE PREFERRED EMBODIMENT

Conventionally, after powering on a microcomputer, the specific internal register will not clear its content. Usually, a specific value will be set to the specific internal register during reset, but not set to the general register in the microcomputer and the external memory. The specific value can be some constant value such as 55 or AA, or meaningless content.

Figure 1:
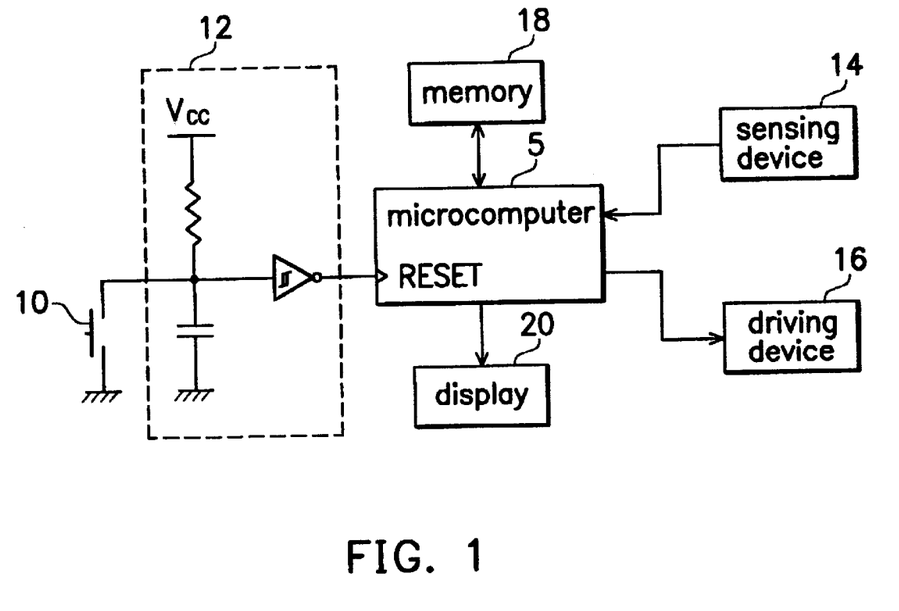
FIG. 1 is a block diagram of a microcomputer system circuit according to the present invention.

Referring to FIG. 1, the microcomputer system of the present invention comprises a microcomputer 5, a reset key 10, a reset circuit 12, a sensing device 14 for sensing the input signal, a driving device 16 for controlling the output signal, an external memory 18, and a display 20. In the microcomputer system, the sensing device 14, the driving device 16, the external memory 18, and the display 20 are respectively connected to the microcomputer 5. The sensing device 14, such as a strainometer, flow rate meter, spring switch, thermometer, or manometer senses the input signal and outputs the sensed signal to the microcomputer 5. The driving device 16, such as relay, step motor, D/A converter, PWM motor, etc., is controlled by the microcomputer 5 to drive the corresponding device.

In the configuration of FIG. 1, the russet key 10 and the reset circuit 12 are connected to the reset pin of the microcomputer, thereby achieving the object of the present invention by use of the power on reset or the push-down reset.

Figure 2:
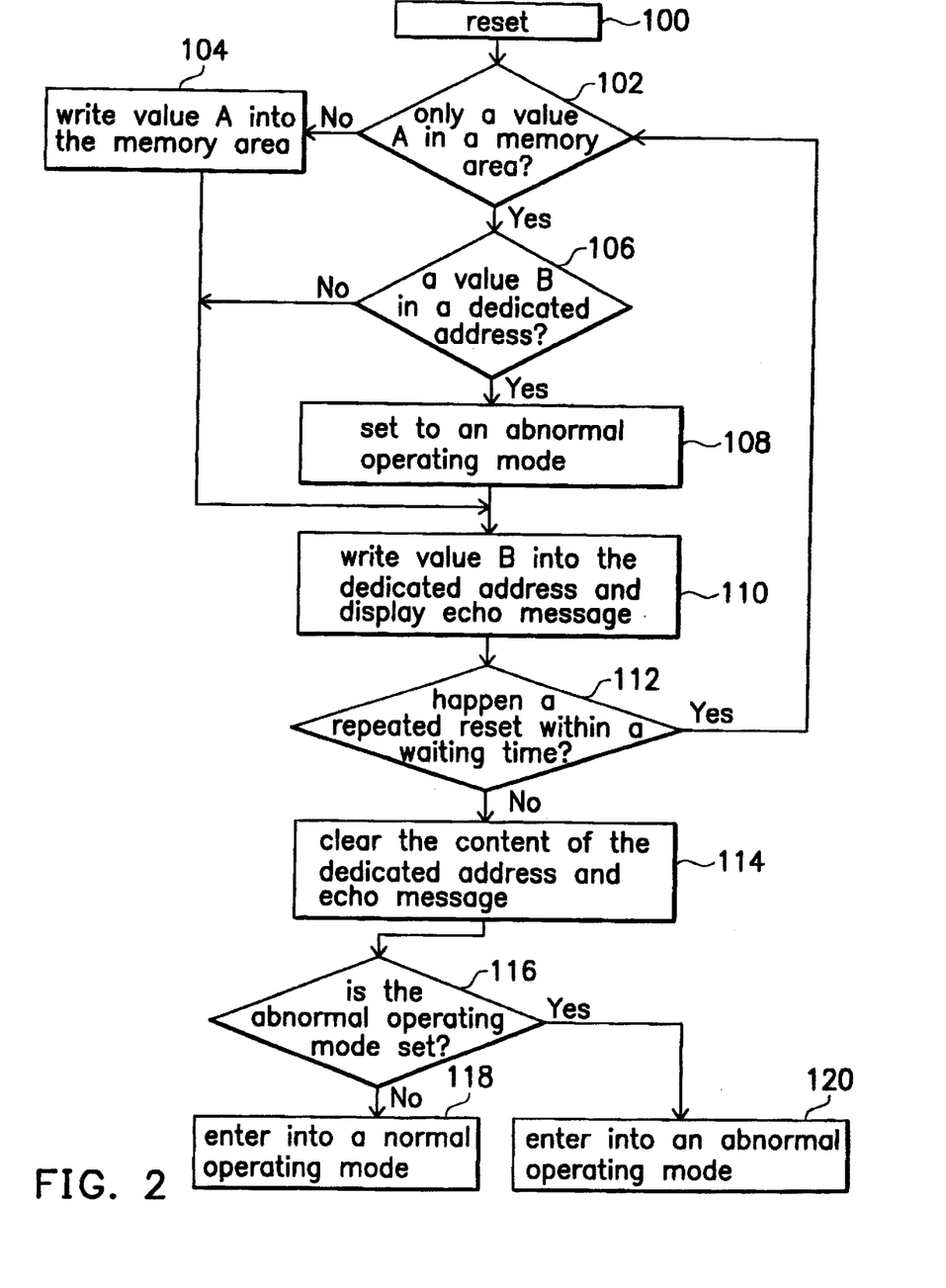
FIG. 2 is a flow chart illustrating the reset operation of a microcomputer system according to a first embodiment of the present invention.

Referring to FIG. 2, the method of using the repeated reset to enter into different modes of the first embodiment of the invention comprises the steps of:

(i) after power-on reset or manual push-down reset (step 100), check first a specific memory area or the specific register in the microcomputer to see if a specific value A is present (102);

(ii) if only the value A is present, indicating that the microcomputer system is possibly in a repeated reset, check to see if a specific value B is stored in a dedicated address (dependent on the programming)(step 106);

(iii) if the specific value B is present, indicating that the microcomputer system is in a repeated reset, set the microcomputer system into an abnormal operating mode (step 108);

(iv) if a value other than the value A is present in either the specific memory area or in the microcomputer register, indicating that the microcomputer system is not in a repeated reset condition, write the value A into the memory area or the register (step 104);

(v) write the value B in the dedicated address and display an echo message (step 110);

(vi) if a repeated reset happens within a predetermined waiting time, return to step 102 (step 112);

(vii) if a repeated reset does not happen during the predetermined waiting time, clear the content of the dedicated address and clear echo message (step 114);

(viii) check if there is an abnormal made set (step 116); if an abnormal mode is set, enter the microcomputer into an abnormal operating mode(step 120); if an abnormal mode is not set, enter the microcomputer into a normal operating mode (step 118).

The abnormal operating mode can be an auto-correction mode or a system establishment mode, instead of the self-detection mode, based on the system needs.

Figure 3A:
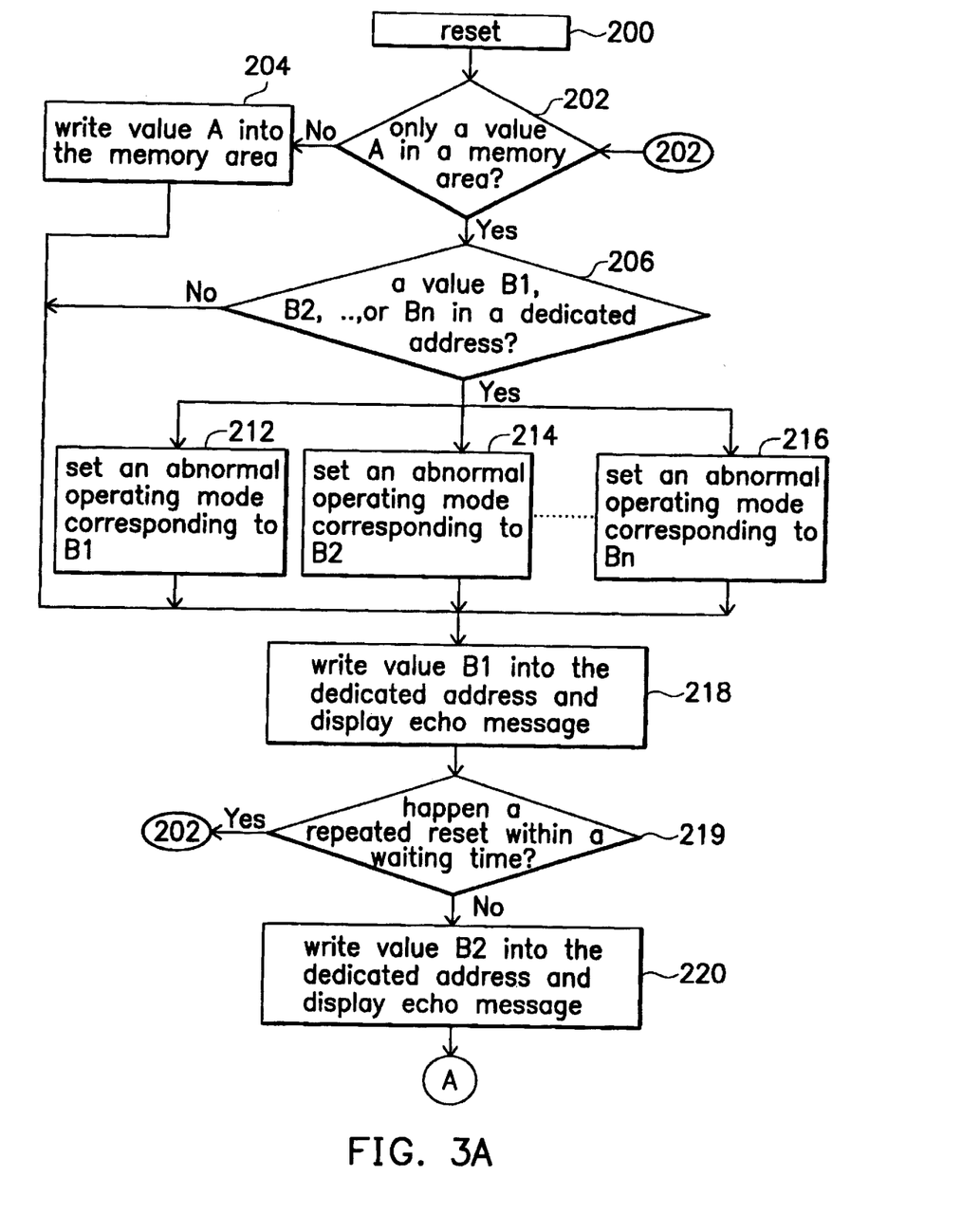
FIGS. 3A and 3B are flow charts illustrating the reset operation of a microcomputer system according to a second embodiment of the present invention.
Figure 3B:
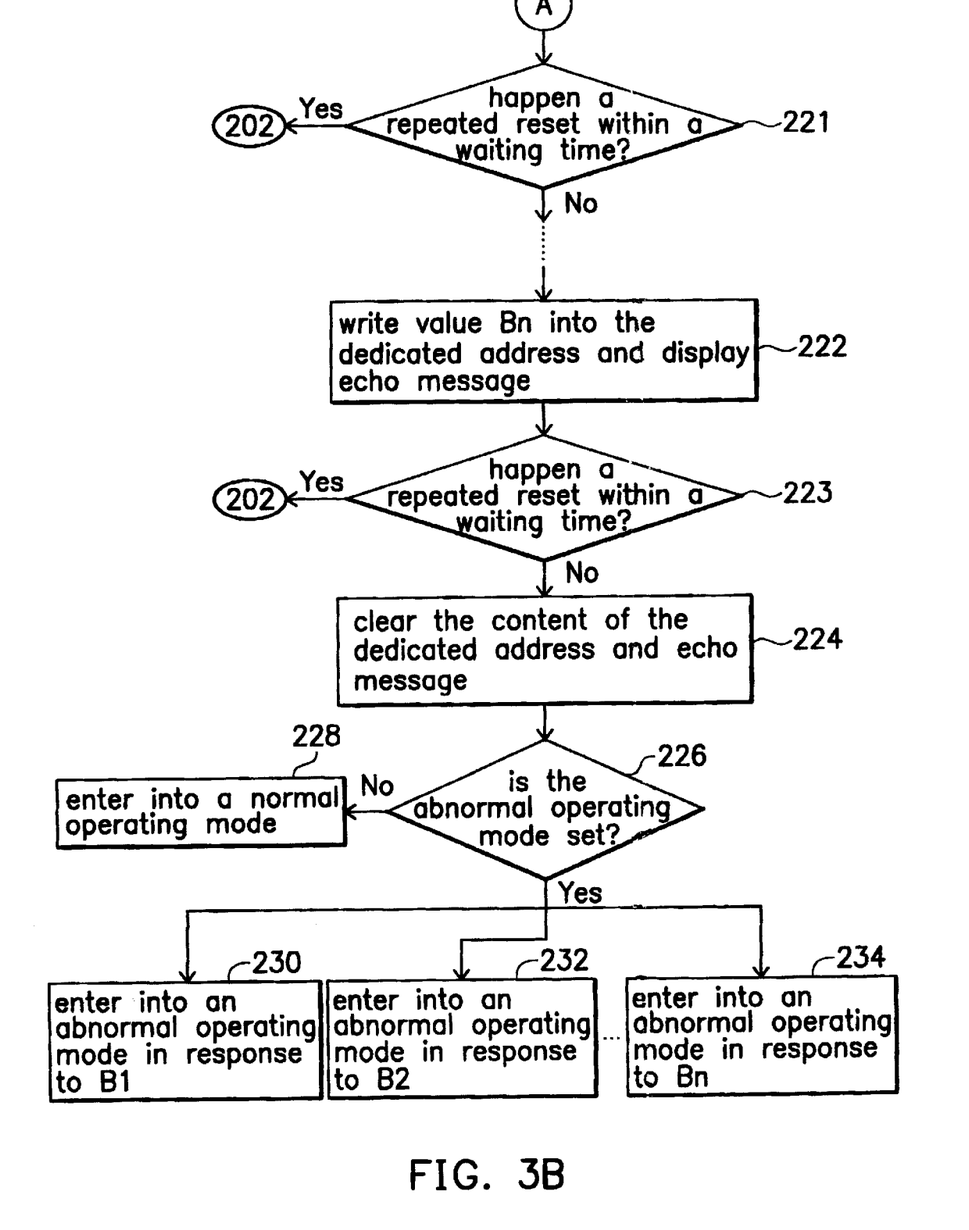

In a second embodiment of the present invention, a microcomputer system can be entered into a plurality of abnormal operating modes utilizing the repeated reset operation. FIGS. 3A and 3B illustrate a flow chart of the reset method for a system with at least two abnormal operating mode, the method comprising the steps as follows:

(i) after power-on reset or manual push-down reset (step 200), check a specific area in the memory or the specific register in the microcomputer to see if a specific value A is present (202);

(ii) if only the value A is present, indicating that the microcomputer system is possibly in a repeated reset, check to see if one of specific values B1, B2, B3, . . . , Bn is stored in the dedicated addresses (dependent on the programming) (step 206);

(iii) if one of the specific values B1, B2, B3, . . . , Bn is present, indicating that the microcomputer system is in a repeated reset, set the microcomputer system into an abnormal operating mode corresponding to the specific values B1, B2, B3, . . . , Bn (steps 212, 214, 216);

(iv) if a value other than the value A is present in either the memory area or in the microcomputer register, indicating that the microcomputer system is not in a repeated reset condition, write the value A into the memory area or the register (step 204);

(v) write the value B1, B2, . . . , Bn in sequence in the dedicated address and display the echo message (steps 218, 220, 222), interposing a predetermined waiting time after each writing operation (219, 221, 223); wherein, if the systems is reset during the predetermined waiting time, return to step 202; and if the system is not reset during the plurality of predetermined waiting times, clear the content of the dedicated address and echo message (step 224);

(vi) check if there is an abnormal mode set (step 226); if an abnormal mode is set, enter the microcomputer into the set abnormal operating mode (steps 230, 232, 234); alternately, if no abnormal mode is set, enter the microcomputer into a normal operating mode (step 228).

The difference between FIG. 2 and FIGS. 3A and 3B is that the latter have more than one specific value, each of which represents an abnormal operating mode. When performing the reset operation, each of the operating modes has its own time slot in which the system can be reset in order to enter into the corresponding operating mode. The echo message displayed when the time slots are switched aids the operator in determining when to reset the system in order to enter a particular abnormal operating mode. However, such a method leads to a long power on procedure and the display of useless echo messages.

Figure 4A:
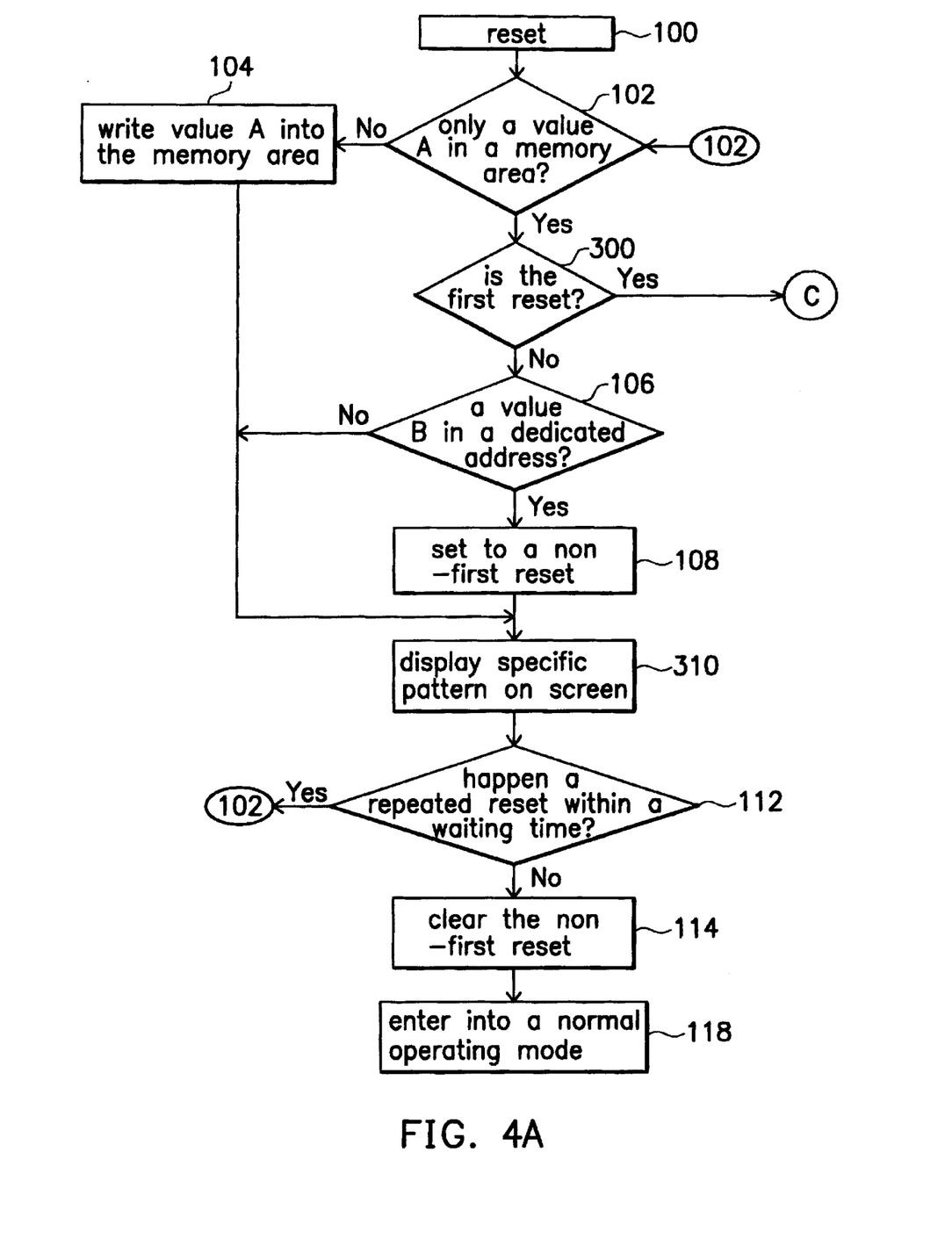
FIGS. 4A–4C are flow charts illustrating the reset operation of a microcomputer system according to a third embodiment of the present invention.
Figure 4B:
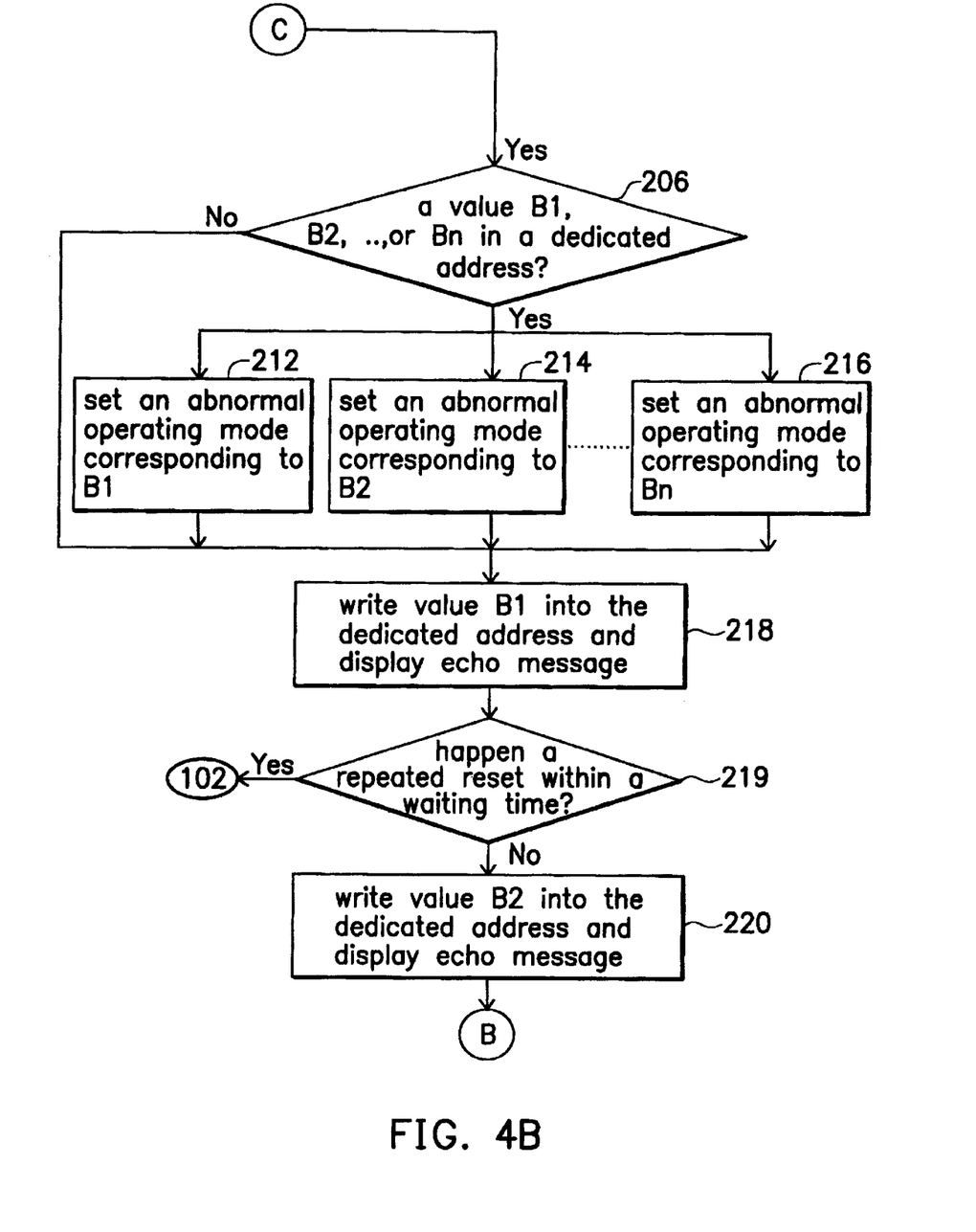
Figure 4C:
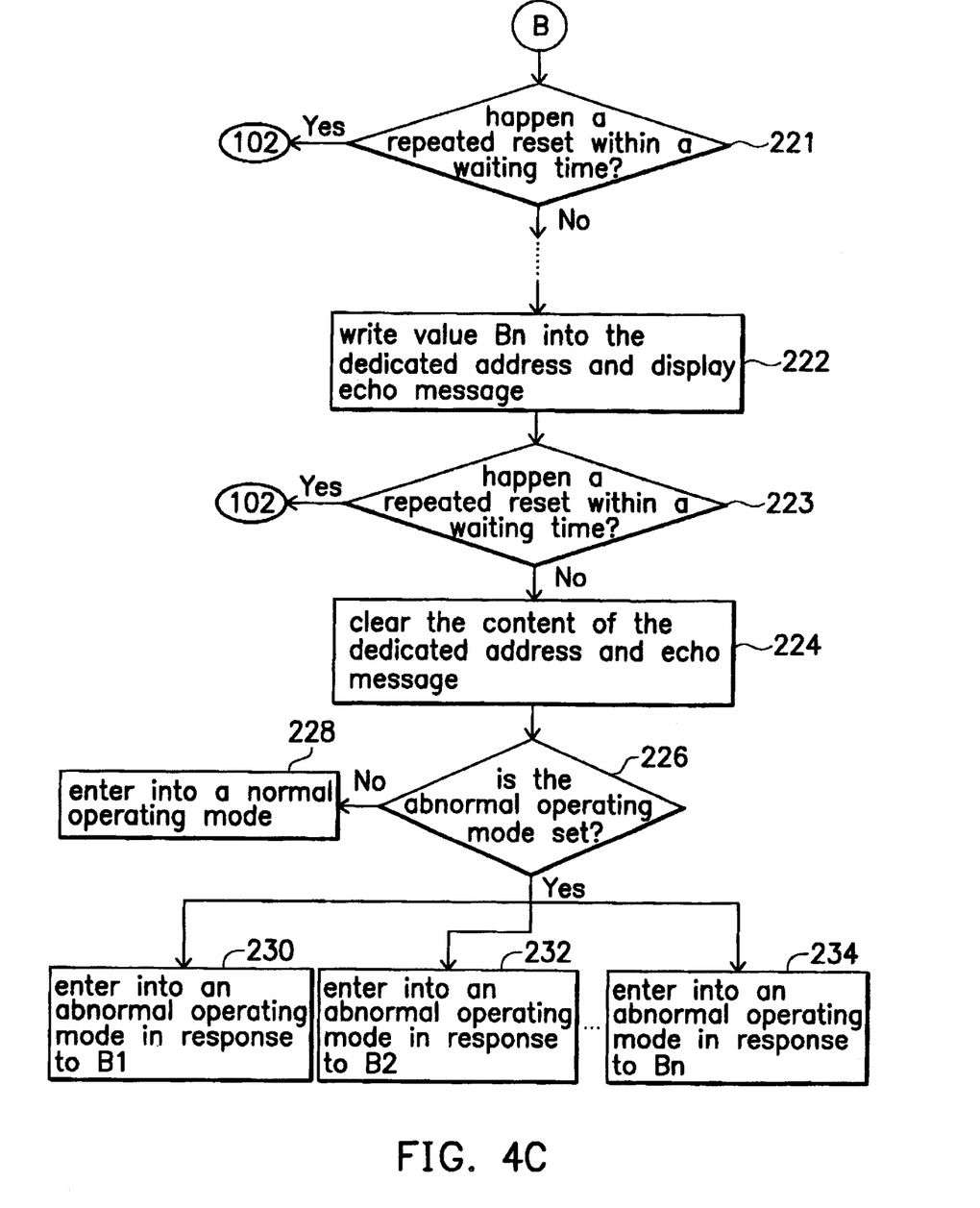

To solve this problem, an third embodiment of the present invention is shown in FIGS. 4A to 4C. Referring to FIG. 4, additional step 300, which is interposed between steps 102 and 106 of FIG. 2, will check whether or not a non-first reset flag is set, and step 310, instead of step 110 of FIG. 2, will display a discernable pattern instead of the echo message on screen. In step 300, no matter after the first time reset inputted or after any operating mode processed, the microcomputer will perform the remaining procedures in FIG. 2 during resetting, except for displaying the discerned pattern instead of the echo message on screen, as shown in FIG. 4A. On the other hand, if a repeated reset happens in step 300, the microcomputer will perform step 206 of FIG. 3A as shown in FIG. 4B. That is, if a non-first reset flag is not set and a single second specific value is not present, a specific pattern is displayed; if a non-first reset flag is not set and a single second specific value is present, the non-first reset flag is set and a specific pattern is displayed; if a non-first reset flag is set and one of a plurality of predetermined specific value corresponding to a plurality of operating mode is present, the corresponding operating mode is set and an echo message is displayed; if an abnormal mode is set, the microcomputer system is entered into a corresponding operating mode; if not, clearing the non-first flag and entering a normal operating mode, wherein, the abnormal mode is set if the non-first flag is set and a repeated reset happens within a predetermined waiting time.

Further, step of checking for the value A is performed under the condition of having a variable value in the specific memory, thereby preventing the system from incorrectly determining that an abnormal operating mode is already set during power on. Therefore, the action of checking value A in FIG. 2 and FIGS. 3A and 3B can be omitted if there is a fixed value in the specific memory during power on, i.e., steps 102, 104 and steps 202, 204 can be omitted when the value in the specific memory is fixed.

Although the present invention has been described in its preferred embodiments, it is not intended to limit the invention to the precise embodiments disclosed herein. Various alterations and modifications will be evident to those who are skilled in this art without departing from the scope and spirit of the present invention. Therefore, the scope of the present invention shall be defined and protected by the following claims and their equivalents.

What is claimed is:

1. A method of entering a microcomputer system into an operating mode using a repeated reset operation comprising the steps of:

(i) checking a dedicated address of the memory to see if a second specific value is present after power-on reset or manual reset, wherein, if the second specific value is present, the microcomputer system is set into a first operating mode;

(ii) writing the second specific value into the dedicated address of the memory and displaying an echo message;

(iii) if a repeated reset happens within a predetermined time, returning to step (i); if not, clearing the content of the dedicated address and the echo message on display;

(iv) if the first operating mode is set, entering the microcomputer in the first operating mode; if not, entering the microcomputer in a second operating mode.

2. The method as claimed in claim 1, further comprising, prior to step (i), the steps of:

(1) checking a specific memory area or the specific register in the microcomputer to see if a first value is present;

(2) if only the first value is present, indicating that the microcomputer system is possibly in a repeated reset, going to step (i);

(3) if a value other than the first value is present in either the specific memory area or in the microcomputer register, indicating that the microcomputer system is not a repeated reset condition, writing the first value into the memory area or the register, and then going to step (ii).

3. The method as claimed in claim 1, wherein the first operating mode is an abnormal operating mode, and the second operating mode is a normal operating mode.

4. The method as claimed in claim 3, wherein the abnormal operating mode is a self-detection mode.

5. A method of entering a microcomputer system into an operating mode using a repeated reset operation, the microcomputer having a plurality of predetermined specific values corresponding to a plurality of abnormal operating modes, comprising the steps of:

(i) checking a dedicated address of the memory after power-on reset or manual reset, wherein, if a predetermined specific value is present, indicating that the microcomputer system is in a repeated reset, setting the microcomputer system into the abnormal operating mode corresponding to the predetermined specific value;

(ii) writing the plurality of predetermined specific values in sequence in the dedicated address of the memory, wherein an echo message is displayed after each writing operation, and a predetermined waiting time is interposed after each writing operation, wherein if the system is reset during the predetermined waiting time, returning to step (i);

(iii) clearing the content of the dedicated address and the echo message if the system is not reset during the plurality of predetermined waiting times; and (iv) checking if an abnormal operating mode is set in the microcomputer in response to one the predetermined specific values; if yes, the microcomputer enters into the respective abnormal operating mode; if not, the microcomputer enters a normal operating mode directly.

6. The method as claimed in claim 5, further comprising, prior to step (i), the steps of:

(1) checking a specific memory area or the specific register in the microcomputer to see if a first value is present;

(2) if only the first value is present, indicating that the microcomputer system is possibly in a repeated reset, going to step (i);

(3) if a value other than the first value is present in either the specific memory area or in the microcomputer register, indicating that the microcomputer system is not a repeated reset condition, writing the first value into the memory area or the register, and then going to step (ii).

7. A method of setting the operating mode of a microcomputer system using a repeated reset operation comprising the steps of:

(i) checking a specific memory area or the specific register in the microcomputer, wherein, if a value other than a first value is present in either the specific memory area or in the microcomputer register, writing the first value into the memory area or the register, and then going to step (iv);

(ii) checking whether a non-first reset flag is set;

(iii) checking a dedicated address of the memory;

(iv) if a non-first reset flag is not set and a predetermined single second specific value is not present in the dedicated address, displaying a specific pattern; if a non-first reset flag is not set and a single second specific value is present in a dedicated address, setting the non-fist reset flag and displaying a specific pattern; if a non-first reset flag is set and one of a predetermined plurality of specific values corresponding to a plurality of operating mode is present, setting the corresponding operating mode and displaying an echo message; and (v) if an abnormal mode is set, entering the corresponding operating mode; if not, clearing the non-first reset flag and entering a normal operating mode.

8. The method as claimed in claim 7, wherein in the step (iv), if the non-first reset flag is set and a repeated reset is present within a predetermined waiting time, the abnormal mode is set.

9. A microcomputer system utilizing a repeated reset operation to set an operating mode, comprising:

a microcomputer;

a memory connected to the microcomputer;

a reset key to reset the microcomputer system; and a reset circuit to provide a power on reset pulse required in the microcomputer system or to receive the reset pulse produced by reset key;

wherein, the microcomputer system checks a dedicated address content in the memory, and if a specific value is present, the microcomputer system is set to a first operating mode, and if a specific value is not present, the microcomputer system writes the specific value into the dedicated address in the memory and waits for a predetermined time, wherein the microcomputer is set to a second operating mode if the microcomputer system is not reset within the predetermined waiting time.

10. The microcomputer system as claimed in claim 9, further comprising a display device connected to the microcomputer to display message when the specific value is written to the dedicated address in the memory.

11. The microcomputer system as claimed in claim 9, wherein the first operating mode is an abnormal operating mode, and the second operating mode is a normal operating mode.

* * * * *